Patented Apr. 27, 1943

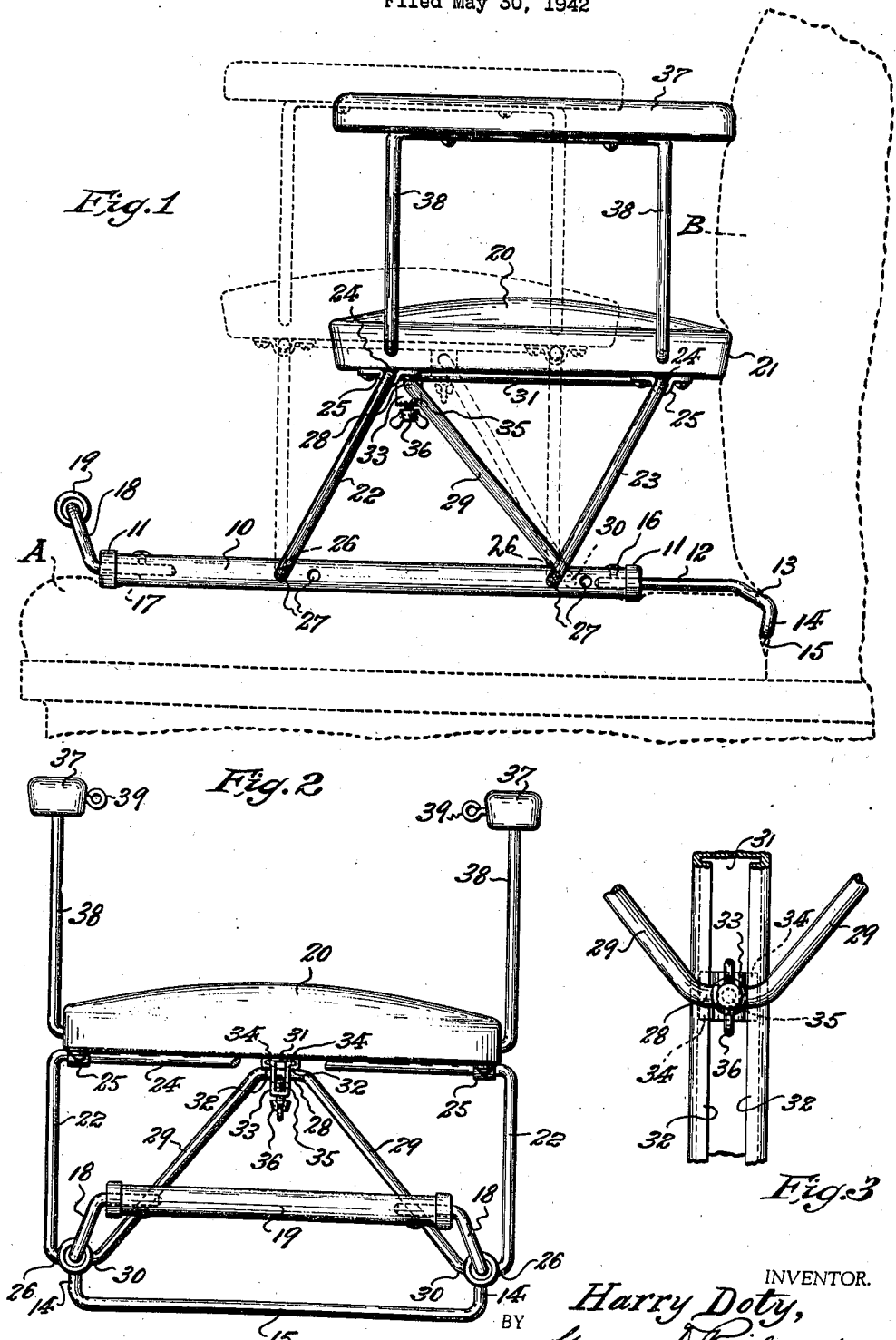
April 27, 1943.  H. DOTY  2,317,894
AUXILIARY SEATING FOR AUTOMOBILES
Filed May 30, 1942
INVENTOR.
Harry Doty,
BY George D. Richards,
ATTORNEY.

2,317,894

UNITED STATES PATENT OFFICE 2,317,894

AUXILIARY SEATING FOR AUTOMOBILES

Harry Doty, Roosevelt, N. Y.

Application May 30, 1942, Serial No. 445,142

6 Claims. (Cl. 155—11)

This invention relates to improvements in auxiliary seating for automobiles; and the invention has reference, more particularly, to a novel demountable chair structure for seating a small child in an automobile.

This invention has for an object to provide a novel child's chair structure adapted for quick and easy application to a permanent automobile seat, and, by a simple manipulation, arranged to so engage the seat and back cushions thereof as to be firmly disposed in a service position and securely held against accidental displacement from such service position.

This invention has for a further object to provide a novel demountable child's chair for auxiliary application to and upon a permanent automobile seat comprising a supporting means to overlie the automobile seat cushion, including anchoring means at its rear end insertable betweeen the rear side of said seat cushion and the upholstered or cushioned seat back, a chair bottom carried by a swingable leg structure from said supporting means, and a lockable stay means arranged between the underside of said chair bottom and said supporting means; said chair bottom being swingable to compressibly engage the resilient upholstered or cushioned automobile seat back by the rear side of said chair bottom so as to somewhat imbed the latter in the former, and, when secured in such relation by the lockable stay means, being subject to the thrusting pressure of the compressed automobile seat back, whereby the supporting means and chair structure as a whole is firmly and securely but releasably held against accidental shifting or displacement either horizontally or vertically.

Other objects of this invention, not at this time more particularly enumerated, will be understood from the following detailed description of the same.

An illustrative embodiment of this invention is shown in the accompanying drawing, in which:

Fig. 1 is a side elevation of the novel child's chair structure according to this invention, the operative applied relation of the same to a seat cushion and back cushion of an automobile seat being shown by full line representation, and its released position, ready for removal from the automobile seat, being shown by dotted line representation; Fig. 2 is a front elevation of the chair structure; and Fig. 3 is an enlarged fragmentary plan view of the releasable means for locking the chair bottom stay of the chair structure.

Similar characters of reference are employed in the hereinabove described views, to indicate corresponding parts.

Referring to the drawing, the supporting means of the chair structure comprises a pair of parallel laterally spaced base bars 10. These base bars are preferably made of wood, and are also preferably of circular cross-section so as to present no sharp edges in engagement with the upholstery of an automobile seat cushion overlaid thereby when the chair structure is in use. Said base bars may be equipped at their ends with metallic ferrules 11 to insure against accidental splitting thereof. The rear end portions of said base bars 10 are provided with axial sockets to receive the arms 12 of an anchoring means with which the rearward end of the supporting means is provided. Said arms 12 are provided with dowwnwardly inclined extensions 13 terminating in angularly bent sections 14 which are somewhat obliquely and inwardly inclined relative to a plane perpendicular to the horizontal plane of the supporting means, and extending between said sections 14 is a transverse anchor bar 15. By reason of the angularity of the extensions 13 and sections 14, said anchor bar 15 is downwardly offset in a plane below and parallel to the plane of said base bars 10, and consequently is so disposed as to be easily insertable behind the rear side of an automobile seat cushion A upon and across which the base bars are laid. By reason of the oblique extension of the sections 14 toward the rear side of the automobile seat cushion, the anchor bar 15, when thrust toward the latter, will tend to imbed itself in the resilient surface thereof with strong resistance to upward displacement. Said anchor bar 15, its arms 12, and the intermediate angular extensions 13 and sections 14 are preferably made in one piece out of metallic rod stock of less diameter than the diameters of the base bars 10. The ends of the arms 12, as coupled to the base bars 10 by insertion in the rear end sockets with which the latter are provided, are secured against disconnection by set screws 16 (see Fig. 1).

The forward end portions of the base bars 10 are likewise provided with axial sockets to receive the shanks 17 of upwardly extending bracket arms 18 to and between which is affixed a foot rest member 19. Said foot rest member and its bracket arms thus interconnect the forward ends of the base bars 10, in such manner that the foot rest member is disposed transversely at the front of the supporting means, and in a plane above the horizontal plane thereof.

The reference character 20 indicates the chair bottom of the structure, which may be made in any suitable manner, and covered and padded as may be desired. Said chair bottom is rectangular in shape, so as to provide lateral sides and a rear side 21. Said chair bottom is supported, subject to back and forth swinging movement by leg structures which rise from the base bars 10 of the supporting means. Said leg structures comprise a pair of forward legs 22 and a pair of rear legs 23, each pair of legs terminating at their upper ends in an intermediate transverse cross bar 24 upon which the chair bottom 20 is supported; said leg structures being pivotally related to the chair bottom by bearing straps 25 which are affixed to the latter and in which their cross-bars 24 are journaled. The lower extremities of the legs 22—23 are inturned to provide pivoting or hinging studs 26 which are fulcrumed in lateral bearing openings 27 provided in exterior sides of the base bars 10. A pluralty of said bearing opening sets may be provided and disposed in suitably spaced relation along the base bars, and with which the legs 22—23 may be selectively engaged for purposes hereinafter more particularly set forth.

Arranged between the base bars 10 and the underside of the chair bottom 20 is a stay means, including means to releaseably secure the same in operative chair bottom staying position. In a preferred form thereof, said stay means comprises a transverse top section 28, from the opposite ends of which downwardly extend divergent strut elements 29 which terminate in pivoting or hinging studs 30 which are fulcrumed in lateral bearing openings respectively provided in interior sides of the respective base bars 10, adjacent to the rear ends thereof. Affixed to the under side of said chair bottom 20, in a central position extending between the front and rear sides thereof, is a channeled guide member 31 having longitudinal keeper flanges 32 overhanging its channeled way. Slidably movable in this guide member 31 is a dependent slide piece 33, having oppositely projecting runner lugs 34 slidably movable in the guide-member way and beneath the keeper flanges 32. The walls of said slide piece 33 are slotted to receive the top section 28 of the stay means. Threaded through the end of said slide piece 32 is a lock-screw 35 having a winged head 36 for turning the same. When said lock-screw is turned home it engages the top section 28 of the stay means and frictionally binds the same against the exterior surface of the guide member 31 so as to lock the slide piece 33 against sliding movement, and thereby effectively but releaseably securing the stay means in a desired chair bottom holding and bracing position.

The chair bottom 20 is provided at its sides with upstanding arm rests 37, supported in a plane above the plane of the chair bottom 20, by suitably formed carrying posts 38, which are affixed to and rise from the sides of said chair bottom 20.

To operatively apply this auxiliary chair structure to an automobile seat, the stay means is released to allow the chair bottom 20 to be swung forward to or beyond the position thereof indicated by dotted line representation in Fig. 1. The supporting means is then deposited on the top of the automobile seat cushion A, and so manipulated as to insert the transverse anchor bar 15 downwardly between the upholstered or cushioned back B of the automobile seat, whereby said anchor bar 15 engages the rear side of said seat cushion A, while the base bars 10 of the supporting means extend forwardly across the latter.

When the supporting means is thus disposed, the chair bottom 20 is swung rearwardly toward and pushed firmly home against the seat back cushion B, so that the rear side of the chair bottom tends to compress and somewhat indent said back cushion, and whereby, in like manner, the rear ends of the arm rests 37 also compress and somewhat indent said back cushion (see full line representation in Fig. 1).

After the chair bottom and its arm rests are engaged with the resilient seat back cushion B in the above described manner, the same are secured in such engaged relation by turning home the lockscrew 35 so as to secure the slide piece 33 and the top section 28 of the stay means against movement relative to the guide member 31 and chair bottom; thus locking the stay means in chair bottom holding position and against forward swinging movement away from the seat back cushion B.

The compressed parts of the resilient seat back cushion B will exert a strong outward tensional thrust upon the chair bottom and arm rests, but since the latter are unyieldingly held by the secured stay means against movement, the effect of such thrust is transmitted to the chair structure as a whole, including the supporting means, so that tendency to forward movement under such thrusting pressure is transmitted to the anchor bar 15 of the supporting means, whereby the back of the seat cushion A is indentingly engaged by said anchor bar 15, so as to strongly resist any tendency to upward displacement. The indenting engagement of the seat back cushion B also resists any tendency to upward displacement or movement of the chair structure. It will thus be obvious that the chair structure is firmly held in position and bound to the automobile seat against either horizontal or vertical shifting, bouncing or other displacing movement when subjected to vibration, swinging or jounces caused by the motion or sudden stops of the automobile.

It was mentioned above that a plurality of spaced bearing opening sets 27 are provided in the base bars 10 for hingedly connecting the chair structure legs 22—23 thereto. The purpose of such provision is to permit of selectively attaching the chair bottom and its leg structure in an effective spaced relation to the anchor bar 15, which is best adapted to permit a strong indenting engagement of the chair bottom rear side and arm rest ends with the seat back cushion B. If the seat back cushion B is of the heavily cushioned type, the chair bottom is attached so as to be spaced further forward, but is the seat back cushion is more lightly cushioned or less thickly upholstered, the chair bottom may be attached in a rearwardly shifted position, so that when swung rearwardly it may efficiently engage and compress the thinner seat back cushion in the manner and for the purposes described.

As shown in Fig. 2, the arm rests 37 may be provided with laterally projecting eyes 39, so that a suitable body harness, with which a seated child may be provided, may be anchored to the chair structure, whereby the child will be securely held upon the chair bottom against accidental unseating due to car bouncing, swaying or sudden stops. It will be obvious that any suitable design of harness may be used, such as a waist belt type, cross-belt type or the like.

I am aware that various changes could be made in the above described constructions, and widely different embodiments of this invention could be made without departing from the scope thereof as defined by the appended claims. It is therefore intended that all matter contained in the above description and shown in the accompanying drawing shall be interpreted as illustrative and not in a limiting sense.

I claim:

1. A child's seating chair for attachment to an automobile seat comprising a supporting base structure having anchoring means at its rear end insertable between the rear side of the automobile seat cushion and the seat back cushion, a chair bottom connected by swingable leg means to said base structure, and a lockable stay means arranged between the underside of said chair bottom and said base structure, said chair bottom being rearwardly swingable to compressibly and indentingly engage its rear side with the seat back cushion and being adapted to be secured in such engagement by said lockable stay means, whereby forwardly thrusting pressure exerted by the compressed seat back cushion upon the chair maintains engagement of the base structure anchoring means with the seat cushion and the chair as a whole against accidental horizontal or vertical displacement.

2. A child's seating chair for attachment to an automobile seat as defined in claim 1 wherein the lockable stay means comprises a longitudinal guide means affixed to the underside of the chair bottom, a slide piece movable in said guide means, the upper end of said stay means being pivotally connected to said slide piece, said stay means including divergent strut portions having their lower ends pivotally connected with said base structure, and a locking means manipulatable to secure said slide piece and the associated upper end of said stay means against movement relative to said guide means.

3. A child's seating chair for attachment to an automobile seat comprising a supporting structure formed by laterally spaced base bars to rest upon the automobile seat cushion, a downwardly offset transverse anchor bar connected to and between the rear ends of said base bars, and an upwardly offset foot rest bar connected to and between the forward ends of said base bars, said anchor bar being adapted to be inserted behind and in engagement with the rear side of said seat cushion; a chair bottom having upstanding arm rests at its sides, forward and rearward leg pairs pivotally connected with said chair bottom and having their lower ends pivotally connected with said base bars at the outer sides thereof, and a lockable stay means arranged between the underside of said chair bottom and said base bars, said chair bottom being rearwardly swingable to compressibly and indentingly engage its rear side and the rear ends of its arm rests with said seat back cushion and being adapted to be secured in such engagement by said lockable stay means for the purposes described.

4. A child's seating chair for attachment to an automobile seat as defined in claim 3 wherein the lockable stay means comprises a longitudinal guide means affixed to the under side of the chair bottom, a slide piece movable in said guide means, the upper end of said stay means being pivotally connected to said slide piece, said stay means including divergent strut portions having their lower ends respectively pivotally connected with the respective base bars at the inner sides thereof, and a locking means manipulatable to secure said slide piece and the associated upper end of said stay means against movement relative to said guide means.

5. A child's seating chair for attachment to an automobile seat as defined in claim 1 wherein said base structure is provided with selectively usable means pivotally engageable by said chair bottom leg means, whereby to mount the chair bottom structure in desired spaced relation to the rear end of said base structure and its anchoring means.

6. A child's seating chair for attachment to an automobile seat as defined in claim 3 wherein the supporting structure base bars are provided with selectively usable means pivotally engageable by the chair bottom leg jaws, whereby to mount the chair bottom structure in desired spaced relation to the rear end of said supporting structure and its anchor bar.

HARRY DOTY.